(12) United States Patent
Habberley

(10) Patent No.: US 6,382,402 B1
(45) Date of Patent: May 7, 2002

(54) RECEIVING SECTION

(76) Inventor: Alan Habberley, Featherstone, Staffordshire, WV10 7AW (GB)

( * ) Notice: Subject to any disclaimer, the term of this patent is extended or adjusted under 35 U.S.C. 154(b) by 0 days.

(21) Appl. No.: 09/723,916

(22) Filed: Nov. 28, 2000

(51) Int. Cl.[7] .............................................. B65G 15/08
(52) U.S. Cl. ....................................... 198/823; 198/841
(58) Field of Search ................................. 198/823, 841

(56) References Cited

U.S. PATENT DOCUMENTS 5,799,780 A * 9/1998 Steeb et al. ................. 198/841

FOREIGN PATENT DOCUMENTS

GB        2 188 018        9/1997

* cited by examiner

Primary Examiner—Joseph E. Valenza
(74) Attorney, Agent, or Firm—Oppenheimer Wolff & Donnelly LLP

(57) ABSTRACT

A receiving section is located in the region of a conveyor belt at which loads are deposited onto the belt to support the belt in use. It is a problem with known receiving sections that they have difficulty in dealing with larger loads which tend to be carried by broader conveyor belts. A resilient mount adjacent a centre line of a conveyor is disclosed which has improved spring characteristics which enables an associated receiving section to deal with larger loads.

6 Claims, 2 Drawing Sheets

RECEIVING SECTION

FIELD OF THE INVENTION

The present invention relates to a support for a troughed belt conveyor in the region of feed to the belt. Such supports are known in the conveyor industry as receiving sections.

BACKGROUND OF THE INVENTION

Troughed belt conveyors typically comprise a flexible endless belt supported from beneath by a number of transverse rollers such that a load supporting surface of the belt adopts a trough-like section in use. A receiving section is located in the region of the belt at which loads are deposited onto the belt. Receiving sections may also be arranged to contain dust and overspill from about the belt. Receiving sections of this kind are known, for example, from GB 2188018A. Such receiving sections have proven highly advantageous in use.

However, such receiving sections are adapted only to operate up to certain widths of conveyor belt. As a practical matter, broader belts are used to convey larger loads. As such, it follows that larger heavier loads will be deposited onto broader belts. A heavier load is more likely to damage the belt if the impact is not absorbed correctly and quickly.

There are problems encountered in simply scaling up known receiving section arrangements beyond a certain size. It is known to use cone shaped elastomeric buffers as resilient mounts for the receiving sections to help in the absorption of impact. This gives a highly desirable energy absorption characteristic in that such buffers will absorb an initial load quickly with a relatively large deformation with further deformation, and hence deflection of the receiving section, requiring greater force. However, if an elastomeric buffer is compressed too far, it will become brittle and fail. Thus, generally to deal with larger loads it is necessary to use larger cones of elastomeric material.

Unfortunately, beyond a certain size, the elastomeric cones do not provide sufficient initial displacement when a load impacts onto the belt and the belt instead becomes more easily damaged.

In providing for a receiving section that can cope with large loads, there is a need for a buffer arrangement that does not suffer from the limitations described above.

It is an advantage of the present invention that it provides such a buffer arrangement.

SUMMARY OF INVENTION

According to a first aspect of the present invention, a receiving section comprises two supporting structures each adapted to support one half of the width of a conveyor belt and each having a first independent resilient mount disposed at or adjacent its outer edge away from a centre line of the conveyor belt and a second resilient mount adjacent the centre line of the conveyor so arranged that each supporting structure tends independently to dip downwardly towards the centre line of the conveyor belt under load wherein the second resilient mount comprises a plurality of first and second resilient mounting means extending substantially parallel to the centre line, the first and second mounting means having differing energy absorption characteristics.

Advantageously, the first and second mounting means comprise elastomeric substantially cone shaped mounts.

More preferably each of the second mounting means is approximately two thirds the height of each of the first mounting means.

Additionally, the first independent resilient mounting means comprises a pivot mechanism having a resilient bushing.

BRIEF DESCRIPTION OF THE DRAWINGS

The invention will now be described, by way of example only, with reference to the accompanying drawings, in which.

DETAILED DESCRIPTION OF PREFERRED EMBODIMENTS OF THE INVENTION

Figure 1:
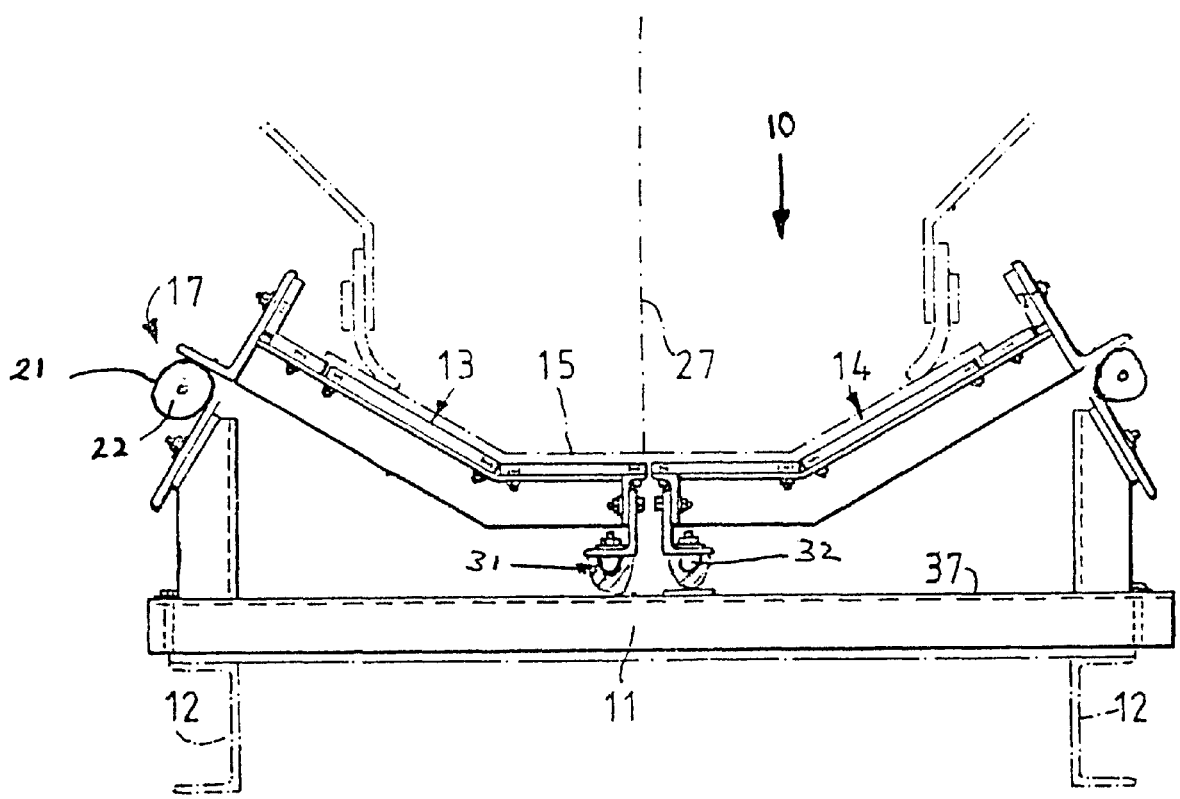
FIG. 1 shows a transverse sectional view of a receiving section in accordance with the present invention.
Figure 2:
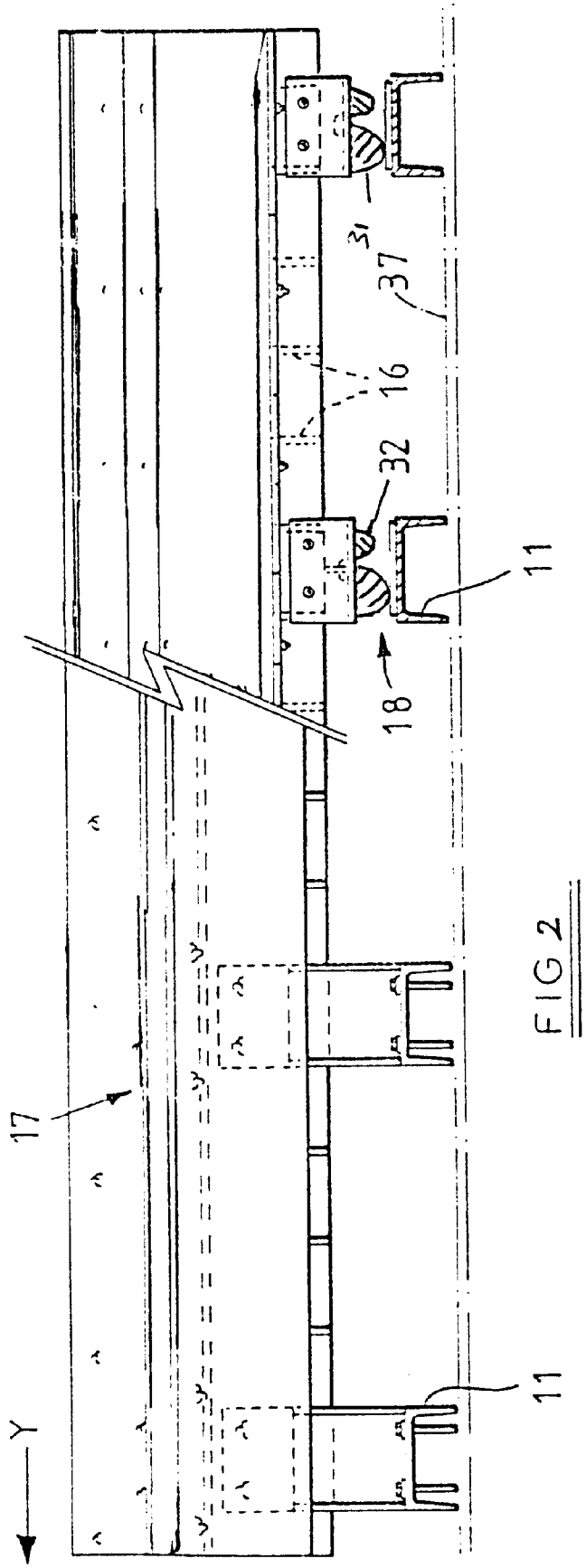
FIG. 2 shows a side elevational view, partly in section, of the receiving section of FIG. 1.

Referring to the drawings, there can be seen a receiving section 10 mounted upon a support. The details of the support are not essential to the present invention. Indeed, the receiving section of the present invention can be used to replace an existing receiving section using the existing supports. However, typically the support comprises transverse support bars 11 supported by beams 12 running in the same direction as the conveyor. The receiving section 10 comprises two identical, mirror image, elongate half shells 13,14. Each half shell is disposed to one side of a centre line 27 such that it supports one half of a conventional conveyor belt 15. The direction of movement of the belt 15 is indicated by the arrow Y in FIG. 2. The shells are together of such a shape so as to match or approximate to the troughed shape of the remainder of the conveyor belt load run. Each half shell comprises is supported by way of edge mounts 17 and centre mounts 18.

Each edge mount 17 comprises a pivot mechanism 21 having a resilient bushing 22. It will be seen that the outer edge of each half shell 13, 14 is thus able to rotate around the surface of the pivot mechanism. Where a resilient mounting is used, connected between each half shell and a support framework, only a relatively small amount of deflection, about 5 degrees, is possible between the half shell and the support framework. The use of a pivoting bush allows for approximately 15 degrees of movement. In addition following an impact which would tend to force a half shell in a direction generally toward or into the pivot mechanism 21, this movement can be absorbed by the resilient bushing 22.

The centre mounts 18 comprise discrete groupings of first and second resilient mounting means in the form of elastomeric cones 31, 32. From the Figures it will be seen that the cones are of differing sizes. The larger of the cones 31 supports each half shell directly upon the transverse support bars 11.

In use, when a load impacts onto the conveyor belt 15, the impact is absorbed initially through the larger of the elastomeric cones 31. The smaller of the cones 32 is sized such that it will begin to absorb a part of the load before the larger elastomeric cone 31 is compressed to its brittle point. In this way, the centre mount 18 is adapted to absorb a large load, while making efficient use of the space available between the lower surface of each half shell 13, 14 and the transverse bars 11.

It will be understood that the energy absorption characteristics of each elastomeric cone 31, 32 can be chosen to suit the particular application. For example, the larger cone 31 may be manufactured from a softer elastomeric material to provide for greater initial deflection.

Additionally, more than two cones of differing sizes may be used.

Additionally, a decking plate 37 may be provided to catch debris reaching the underside of the conveyor belt 15 to enable such debris to be removed at periodic intervals.

It has been found that a receiving section in accordance with the present invention provided with centre mounts of the kind set forth is able to support conveyor belts of widths in excess of 48 to 54 inches.

I claim:

1. A receiving section comprising two supporting structures each adapted to support one half of the width of a conveyor belt and each having a first independent resilient mount disposed at or adjacent an outer edge away from a centre line of the conveyor belt and a second resilient mount adjacent a centre line of the conveyor so arranged that each supporting structure tends independently to dip downwardly towards the centre line of the conveyor belt under load wherein the second resilient mount comprises a plurality of first and second resilient mounting means extending substantially parallel to the centre line, the first and second mounting means having differing energy absorption characteristics.

2. A receiving section according to claim 1, wherein the first and second mounting means comprise elastomeric substantially cone shaped mounts.

3. A receiving section according to claim 1, wherein each of the second mounting means is approximately two thirds the height of each of the first mounting means.

4. A receiving section according to claim 2, wherein each of the second mounting means is approximately two thirds the height of each of the first mounting means.

5. A receiving section according to claim 1, wherein the first independent resilient mounting means comprises a pivot mechanism having a resilient bushing.

6. A receiving section according to claim 1, in which the second resilient mount comprises additional mounting means.

* * * * *